United States Patent
Chang et al.

(10) Patent No.: US 7,155,437 B2
(45) Date of Patent: Dec. 26, 2006

(54) METHOD FOR MULTIPLE CONFIGURATIONS OF WIRELESS NETWORK CONNECTION SETTINGS

(75) Inventors: Ju-Nan Chang, Taipei Hsien (TW); Wen-Biao Lee, Taipei Hsien (TW)

(73) Assignee: Inventec Appliances Corp., Taipei (TW)

( * ) Notice: Subject to any disclaimer, the term of this patent is extended or adjusted under 35 U.S.C. 154(b) by 521 days.

(21) Appl. No.: 10/064,595

(22) Filed: Jul. 29, 2002

(65) Prior Publication Data
US 2004/0019576 A1   Jan. 29, 2004

(51) Int. Cl.
*G06F 17/30* (2006.01)
(52) U.S. Cl. .................. 707/10; 707/101; 707/102; 707/104.1; 709/223
(58) Field of Classification Search .................. 707/10, 707/101, 102, 104.1, 201; 709/223, 220, 709/203; 455/414; 711/129, 153; 701/209; 705/3
See application file for complete search history.

(56) References Cited

U.S. PATENT DOCUMENTS

| | | | | |
|---|---|---|---|---|
| 5,551,027 A | * | 8/1996 | Choy et al. | 707/201 |
| 5,960,194 A | * | 9/1999 | Choy et al. | 707/102 |
| 6,581,038 B1 | * | 6/2003 | Mahran | 705/3 |
| 6,628,938 B1 | * | 9/2003 | Rachabathuni et al. | 455/456.3 |
| 6,754,214 B1 | * | 6/2004 | Mahalingaiah | 370/392 |
| 2003/0083052 A1 | * | 5/2003 | Hosaka | 455/414 |
| 2004/0003060 A1 | * | 1/2004 | Asoh et al. | 709/220 |
| 2004/0249915 A1 | * | 12/2004 | Russell | 709/223 |

* cited by examiner

*Primary Examiner*—Shahid Al Alam
(74) *Attorney, Agent, or Firm*—Winston Hsu

(57) ABSTRACT

A method for a terminal to connect to wireless networks in a wireless network system is disclosed. The wireless network system has a plurality of wireless networks, each having a unique identity. The terminal includes a network database for storing a plurality of predetermined identities, a plurality of configuration tables with each associating different predetermined identities to different priorities, and a status pointer representing when or where the terminal operates. The method includes selecting one configuration table according to the status pointer, comparing the identities received by the terminal with the predetermined identities in the selected configuration table, selecting an identity among the matched identities according to the priority associated with the matched predetermined identities, and connecting to the wireless network corresponding to the selected identity.

20 Claims, 4 Drawing Sheets

METHOD FOR MULTIPLE CONFIGURATIONS OF WIRELESS NETWORK CONNECTION SETTINGS

BACKGROUND OF INVENTION

1. Field of the Invention

The present invention relates to a method for a terminal connecting to a wireless network, and more particularly, a method of wireless connection to automatically choose an appropriate wireless network from a plurality of available wireless networks according to a location and a time of the terminal.

2. Description of the Prior Art

Enormous developments in computer networks enable data and information to spread out rapidly, and advanced technology and knowledge to be communicated efficiently. The development of wireless networks in recent years further enables users to access network resources anytime and anywhere to make information technology more integrated with people's lives and work.

One feature of wireless networks is to eliminate the constraint of transmission wires that are found in wired networks. The terminal of the wireless network can wirelessly transmit data by use of electromagnetic waves or infrared radiation to connect to the wireless network for accessing network resources. In the wireless network system, each network server transmits and receives wireless data signals through an access point. Equally, to access the resources and the services of the wireless network, the terminal must be capable of wirelessly transmitting and receiving data signals. Generally, personal computers and notebooks can expand their capabilities to wireless networking by connecting a wireless network card.

Please refer to FIG. 1. FIG. 1 is a schematic diagram of a typical wireless network 10. In wireless network 10, several independent wireless networks 12A, 12B, 12C and 12D and terminals STA0, STA1, STA2 are included. Take the wireless network 12A for example, it utilizes an access point AP1 and a server S1. The server S1 mainly controls resource access and network operation of the network 12A, and the access point AP1, capable of wirelessly transmitting and receiving data signals, is electrically connected to the server S1. The effective range of the access point AP1 to transmit and receive wireless signals is marked as a dotted effective range region R1 in FIG. 1. In the region R1, the wireless signal transmitted from the access point AP1 can be effectively received by terminals in the region R1, and vice versa. On the contrary, outside the region R1, wireless signals transmitted from the terminals cannot be correctly received by the access point AP1. When in effective range R1, wireless signals transmitted from the terminals can be received by the access point AP1 and then transmitted to the server S1. Data from the server S1 can also be wirelessly transmitted to the terminals through the access point AP1 to allow the terminals to access the network resources of the wireless network 12A. Equally, wireless network 12C utilizes a server S3 and an access point AP3, whereas wireless network 12D utilizes a server S4 and an access point AP4 to provide wireless network services.

A wireless network can broaden its service range by utilizing a plurality of access points. The wireless network 12B in FIG. 1 is an example of utilizing two access points AP2a and AP2b both electrically connected to the server S2. Though separately the overall coverage of effective ranges R2a and R2b served by the access points AP2a and AP2b is limited, a total service area provided by the server S2 is expanded. For example, if the terminal STA1 transmits data to the terminal STA2, the terminal STA1 can first transmit a wireless data signal to the access point AP2a for transferring the data to the server S2. Then, the server S2 transfers the data signal to the access point AP2b, and finally the access point AP2b wirelessly transmits the data signal to the terminal STA2. Therefore, the terminal STA1 can access the resources of the terminal STA2 by use of the services provided by the wireless network 12B.

Wireless networks need no physical transmission lines, and are thus not limited in size or configuration by transmission lines. Typically, only a few specified terminals can be allowed to access the resources of the wireless network. For example, an internal local wireless network of a company is only open to the employees of the company, and a local wireless network utilized at a home is restricted to the terminals belonging to family members. Currently, many communications companies provide paid wireless network connection service, and only people who have paid a fee can access the wireless network. To achieve the purpose of administrating access and allowing authorized terminals to access network resources, the most basic method employed is identity. Each wireless network has a unique identity, and each terminal authorized by the wireless network has a corresponding identity to the authorizing wireless network. For example, the commonly used wireless network standard IEEE 802.11 has defined a service set identity as an identity of a wireless network. Besides this, identity can also be an Internet protocol address. Take the terminal STA0 of FIG. 1 as an example to further illustrate the control of resource access between the terminals and the wireless network. In FIG. 1, networks 12A, 12B, 12C and 12D have the corresponding identities ID1, ID2, ID3 and ID3 separately stored in their respective access points. A resource database DB is stored in the terminal STA0 to record the related information of which wireless networks the terminal STA0 can access.

Please refer to FIG. 2 and FIG. 1. FIG. 2 is a listing of a network database 20 of the resource database DB in the terminal STA0. The related data of wireless networks that the terminal 20 can legally access is stored in the network database 20. Suppose the wireless network 12A is the internal local wireless network of the company in which the user of the terminal STA0 works, the wireless network 12B is a payment network provided by a communications company, and the wireless 12C is a small local wireless network utilized at the terminal STA0 user's home. Therefore, the terminal STA0 can legally access the network resources of the wireless networks 12A, 12B and 12C, and the related information of these 3 wireless networks is stored in the terminal STA0. Please refer to FIG. 2, the network database 20 of the terminal STA0 includes 3 columns, which are wireless network name, predetermined identity, and accessories, wherein the predetermined identity is the unique identity each wireless network owns. The row L1 represents the related information of the wireless network 12A, wherein the wireless network name is company, predetermined identity is ID1, accessories are encrypted key K1, login ID UN1, password Pss1 among others. Similarly, the row L2 records that the wireless network 12B is a payment network, predetermined identity is ID2, with key K2 to encrypt data transmissions, and the terminal STA0 can login the wireless network 12B with login ID UN2, and password Pss2. The row L3 records that the wireless network 12C is a family wireless network of the user of the terminal STA0, with the predetermined identity being ID3, encrypted key being K3, login ID being UN3, and password being Pss3.

In the prior art, administrating access using identities is described as follows. When the terminal STA0 is about to connect to the wireless network 12A utilized in the company, the user has to manually assign the terminal to the wireless network 12A. The terminal STA0 then transmits a wireless probe signal with the predetermined identity ID1 included according to the related information stored in the database 20. The access point AP1 of the wireless network 12A receives the signal with identity ID1 and then responds with a response signal including the identity ID. When the terminal STA0 receives the response signal, it then confirms that the access point AP1 of the wireless network 12A can successfully receive the wireless signal and proceeds with a further certification sequence establishing wired equivalent privacy. The terminal STA0 performs associated sequences such as letting the server S2 know that the terminal STA0 is communicating through the access point AP1. The terminal is then able to login to the server S1 through UN1 and Pss1 as the account and password. Of course, the terminal STA0 is not legally authorized to access the wireless network 12D. The terminal STA0 has no identity ID4 for the wireless network 12D, and cannot connect to the wireless network 12D since no wireless signal including the predetermined identity ID4 is transmitted.

If no response signal including identity ID1 is received for a period of time after the terminal STA0 transmits the wireless probe signal, the terminal is likely outside the effective range of the wireless network 12A. As it is shown in FIG. 1, if the terminal STA0 moves from position P1 to P2 and intends to connect to the wireless network 12A at P2, it receives no response from the access point AP1 since the position P2 is outside the effective range of the network 12A. The terminal STA0 informs the user that the terminal is unable to connect to the wireless network 12A. Then the user can control the terminal STA0 to stop attempting to connect to the network 12A or to retry connecting to another wireless network.

In the prior art mentioned above, the user must manually control the terminal STA0 to connect to the desired wireless network. If the position of the terminal STA0 exceeds the effective range of the wireless network, the user must manually direct the terminal to connect to another wireless network. As discussed above, one advantage of the wireless network is to eliminate the constraints of physical network transmission lines, allowing users to conveniently connect to a network with their terminals anywhere. However, it is difficult for moving users to be aware of which wireless network their terminal is located. So, when the terminal is leaving the service range of a wireless network and reaching another service range of another wireless network, or say, when the terminal is in the overlapping location of two adjacent wireless networks, the user must manually choose a wireless network by the method of trial and error. Though certain network operators provide a configuration table comprising a set of fixed priorities to automatically connect to the wireless network listed in the configuration table, the method is still inconvenient in a varied environment of wireless networks. For example, if the terminal STA0 is located in the company, it is acceptable to connect to the wireless network 12A of the company with a high priority. However, when the terminal STA0 is located at home, then it is much more proper to connect to the wireless network 12C with a priority higher than that of the wireless network 12A. However, the prior art configuration table has fixed priorities. Therefore when at home, the user must inconveniently control the terminal to close the configuration table and then manually connect the terminal to the wireless network 12C.

SUMMARY OF INVENTION

It is therefore a primary objective of the claimed invention to provide a flexible method of automatically connecting to a wireless network to overcome the disadvantages of the prior art.

According to the claimed invention, a terminal is provided capable of wirelessly transmitting and receiving data through a wireless network system comprising a plurality of wireless networks. The plurality of wireless networks comprises different wireless networks have different identities capable of being transmitted wirelessly by each wireless network.

According to the claimed invention, the terminal comprises a plurality of distinct sorting pointers each representing a unique priority, a network database for recording a plurality of predetermined identities, a plurality of configuration tables, and a status pointer for representing an operational location and time. Each configuration table corresponds one predetermined identity to one unique sorting pointer and each configuration table has at least a unique predetermined identity that corresponds to a sorting pointer.

According to the claimed invention, a method receives identities of the plurality of wireless networks via wireless transmission. The method chooses a configuration table from the plurality of configuration tables according to the status pointer and compares the predetermined identity of the chosen configuration table with the identities received, and if any of the plurality of identities received matches the predetermined identity, the method then chooses an identity according to the sorting pointer corresponding to the status pointer. The method wirelessly connects to the wireless network corresponding to the chosen identity.

It is an advantage of the claimed invention that the plurality of priorities and configuration tables provide time saving and convenient wireless network access to the terminal.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
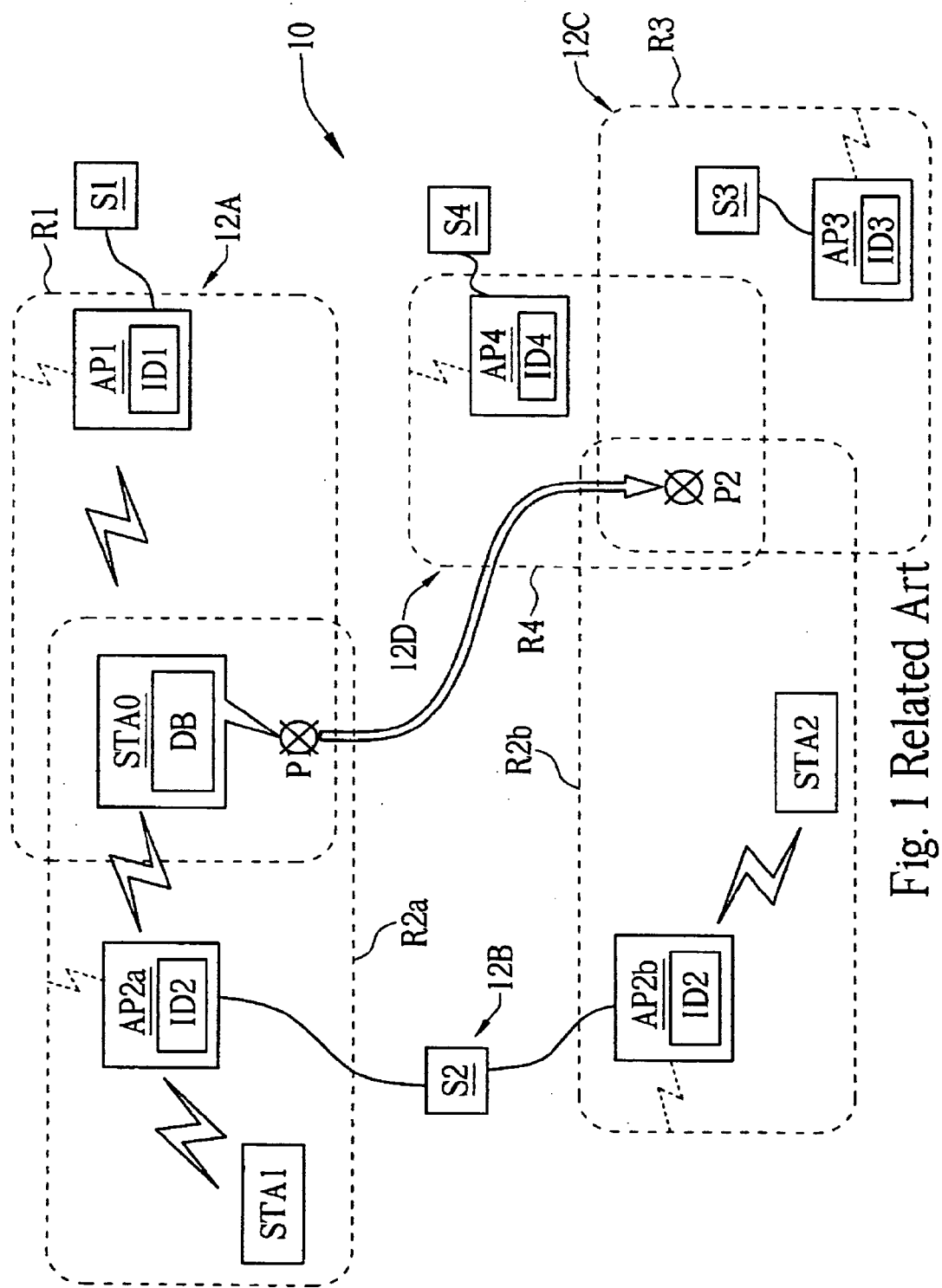
FIG. 1 is a schematic diagram of a typical wireless network.
Figure 2:
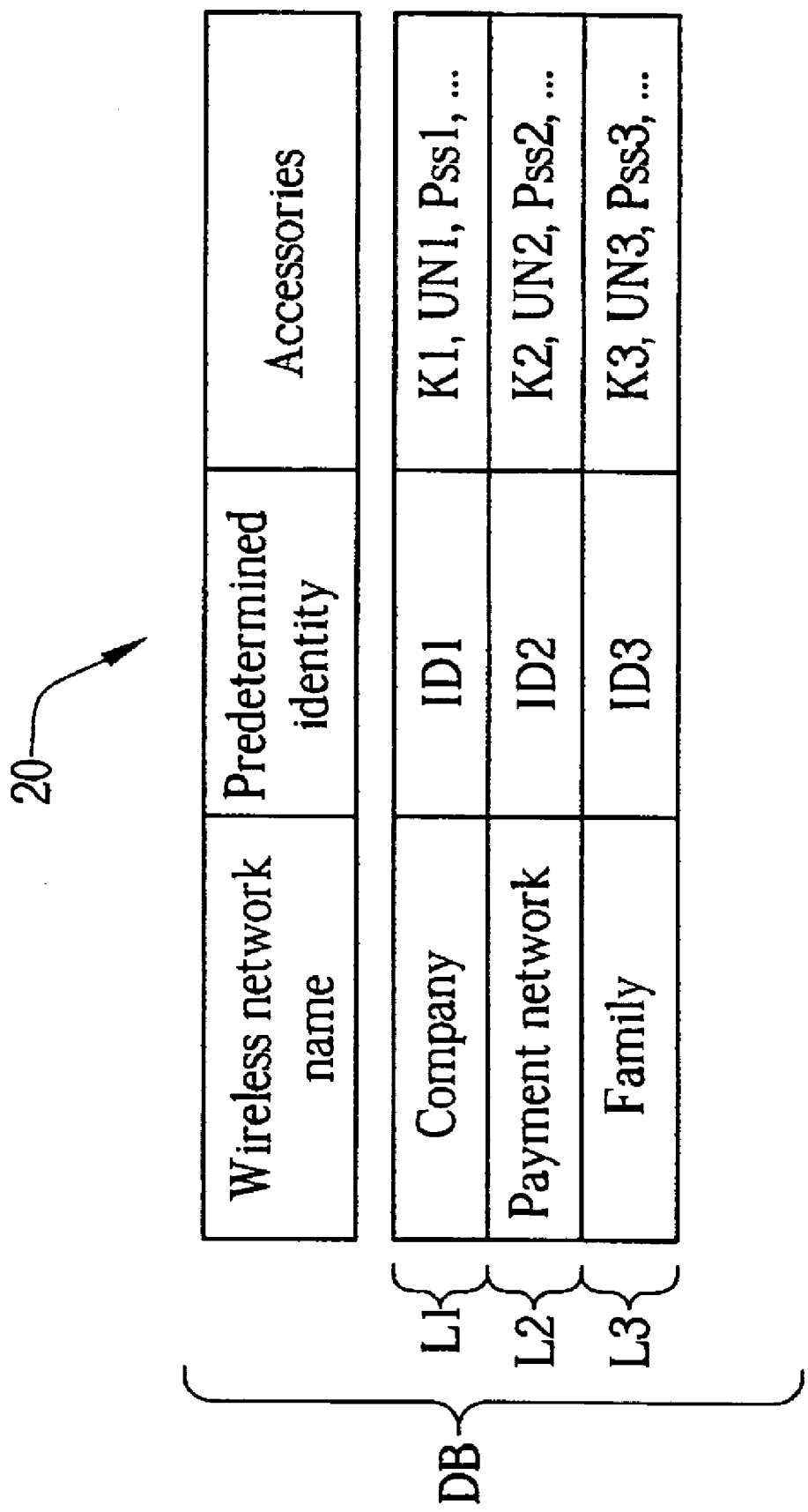
FIG. 2 is a schematic diagram of a network database of a terminal.

The main purpose of the present invention is to provide several sets of priority tables of wireless connection, and to select the most proper priority table referencing a location and time of a terminal. The detailed description below still refers to the wireless network system illustrated in FIG. 1, and the method of the present invention is applied to the terminal STA0 of FIG. 1.

Figure 3:
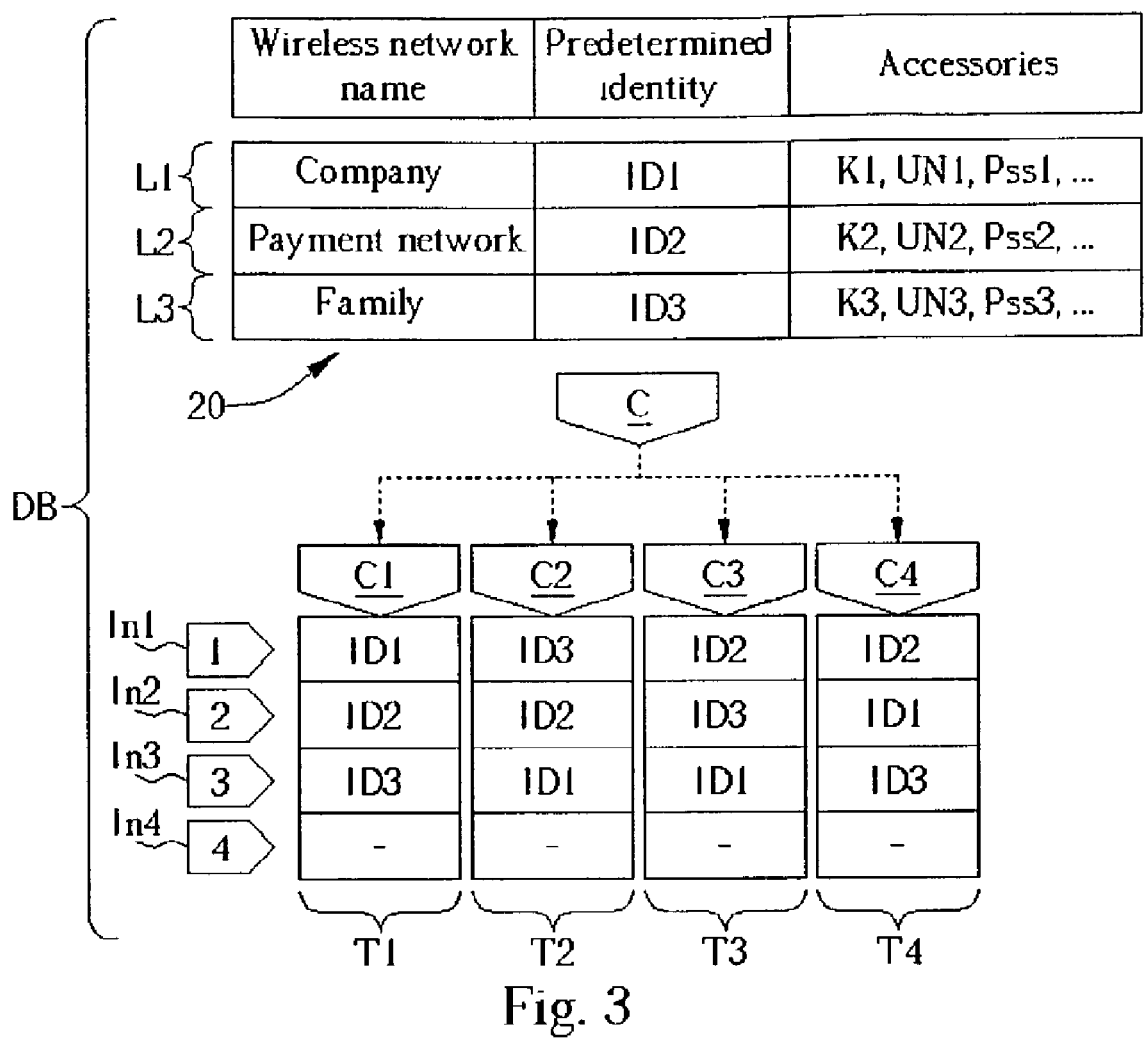
FIG. 3 is a schematic diagram of data in a resource database according to the present invention.

Please refer to FIG. 3. As is described in the aforementioned example, the network database 20 in the resources database DB comprises the related information of wireless networks that the terminal STA0 can legally access. The related information comprises the wireless network ID of the wireless network 12A, 12B and 12C, predetermined identities, and other related information. Additionally, the resources database DB further comprises a status pointer C, a plurality of sorting pointers In1–In4, and a plurality of configuration tables C1–C4. Each sorting pointer In1–In4 represents a different priority and each configuration table C1–C4 corresponds different predetermined identities of wireless networks to different sorting pointers In1–In4. Different configuration tables correspond C1–C4 to different content of the status pointer C. In FIG. 3, the sorting pointer In1 represents the highest priority, and the sorting pointer In2 represents the second highest priority, and so on.

In the present invention, the status pointer C can represent the operating location and time of the terminal STA0. Take the configuration table T1 for example. In order of priority, the configuration table T1 corresponds to a possible status C1 of the status pointer C, wherein the configuration table T1 corresponds the predetermined wireless identity ID1 of the company to the sorting pointer In1, the predetermined wireless identity ID2 of the paid wireless network to the sorting pointer In2, and ID3 of the family wireless network to the sorting pointer In3. Likewise, the configuration table T2 corresponds to another possible status C2 of the status pointer C, wherein the configuration table T2 corresponds the predetermined wireless identity ID3 of the company to the sorting pointer In3, which represents the third highest priority. Similarly, the configuration tables T3 and T4 are provided in the same manner as mentioned above.

Simply speaking, the main purpose of the present invention is for the terminal STA0 to automatically choose a configuration table from different configuration tables C1–C4 according to different contents of the status pointer C, and proceed to wirelessly connect according to the chosen configuration table. The terminal STA0 will try to connect to the wireless network with the highest priority in the configuration table. If the terminal STA0 cannot connect to the wireless network, and it will then try to connect to the wireless network with the second highest priority in the configuration table, and so on. In the operation of the present invention, the status pointer C is directly controlled by a time.

Generally, computers serving as terminals have a clock to provide the time. The user can setup the status of each configuration table C1–C4 in advance in the database DB. For example, the user is at work during the time from AM 9:00 to PM 5:00, Monday to Friday, so the user can map the contents of the status pointer, C1, to these periods of time. During these periods of time, if the user wants to access network resources with the terminal STA0, the terminal STA0 automatically decides to connect to the network assigned by the configuration table T1 according to the content of the status pointer C. Therefore, the terminal connects to the company wireless network with the identity ID1 at the highest priority. Similarly, the user brings the terminal STA0 back home after work, and accordingly, the corresponding status C2 of the predetermined configuration table T2 is mapped to the time between PM 7:00 to PM 11:00, Monday to Friday. Therefore, if the terminal attempts to connect to a network during these periods of time, it automatically decides that the configuration table T2 is adopted to wirelessly connect to the network according to the content of the status pointer C. Finally, the terminal will connect to the family wireless network with identity ID3 at the highest priority.

Figure 4:
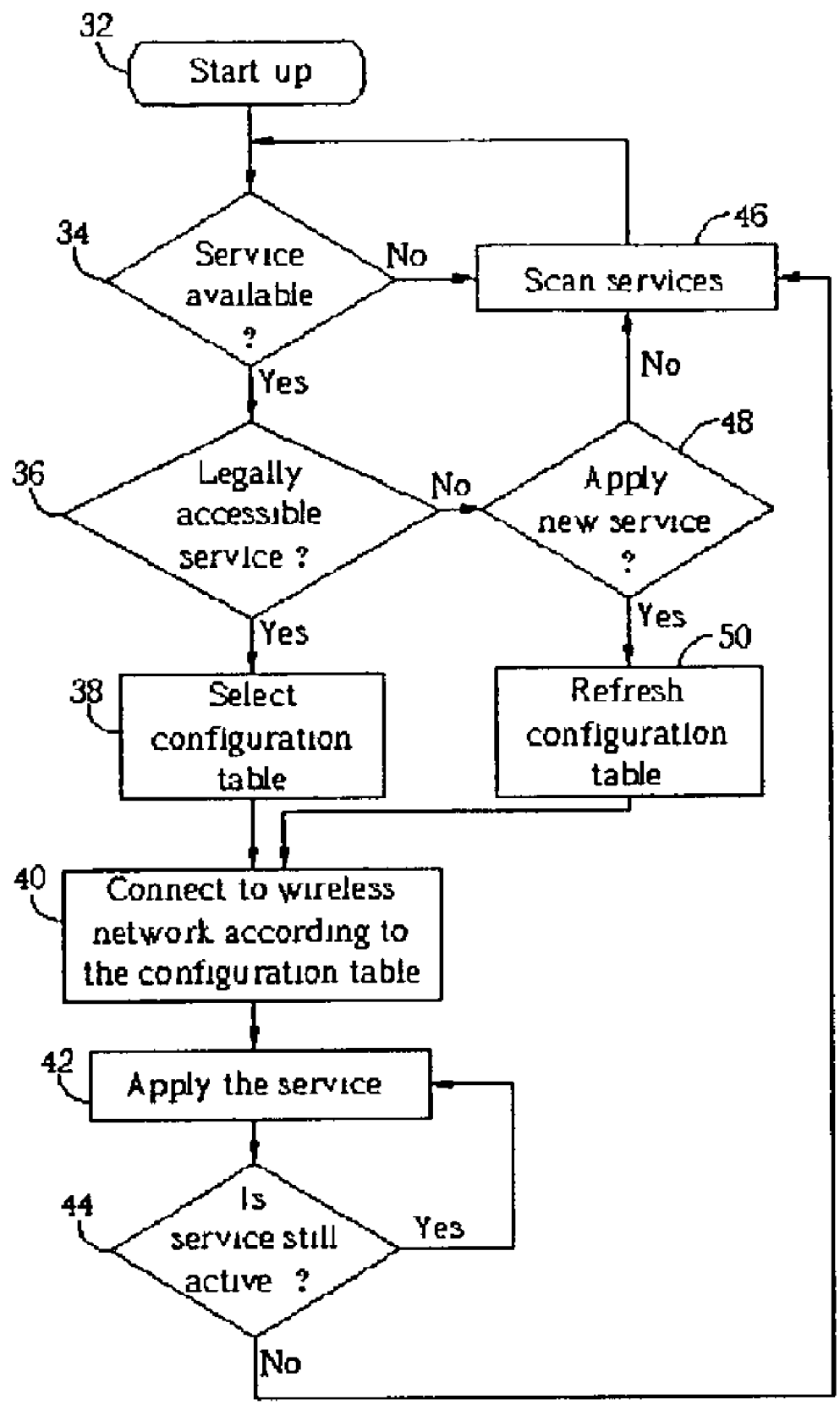
FIG. 4 is a flowchart diagram of a method of the present invention.

Please refer to FIG. 4, which is a flowchart diagram of operation of the present invention. According to the above-mentioned description, the terminal STA0 is provided for implementing the operation of the present invention. The flowchart diagram comprises the following steps:

(32): Start up.

The user starts up the wireless network function of the terminal STA0 and prepares to access the resources of the wireless network.

(34):

Scan services to receive all the identities of the wireless networks. The main purpose of this step is to determine all the wireless networks active in the environment that the terminal is located. Generally speaking, the access point of the wireless network broadcasts a beacon signal containing the identity at a fixed interval. If the terminal receives the beacon signal, the terminal is in a service range and should prepare for connecting to the network. Furthermore, the terminal is capable of actively transmitting a probe containing a certain identity. If the terminal STA0 receives a response signal containing the identity, the terminal STA0 is in the effective service range. To sum up, in this step, all the accessible identities are fetched, and the fetched identities may be varied with the location of the terminal STA0. If the terminal STA0 is in the service range of any network, then proceed to step 36, otherwise, if the terminal STA0 is not in any service range, then proceed to step 46.

(36):

After the service is determined, and the identities are fetched, the terminal STA0 will compare the received identities with the predetermined identities of the network database 20 to decide how many legally accessible wireless networks are available. If a legally accessible wireless network exists, then proceed to step 38. If not, then proceed to step 48.

(38):

Choose a corresponding configuration table according to the content of the status pointer C. As mentioned above, the clock of the terminal STA0 is capable of controlling the content of the status pointer C. In this step, the terminal STA0 will choose a corresponding configuration table according to the content of the status pointer C. After the step 38 is done, proceed to step 40.

(40):

In this step, the terminal STA0 refers to the chosen configuration table to decide which wireless network will be chosen for the terminal STA0 to connect to. The step further comprises sub-steps of authentication, association according to a key, and wired equivalent privacy by encrypting the data with the key. Of course, the terminal may need a login ID and a password to login to the server.

(42):

After the step 40 is completed, the terminal STA0 is capable of accessing the services and resources provided by the selected wireless network.

(44):

During the service sequence of the wireless network, the terminal STA0 continuously monitors the wireless signal from the corresponding access point to see if the connection is still active. If the wireless network is disconnected, then proceed to step 46.

(46):

The terminal STA0 is located in an environment with no wireless network available, or the wireless network has just been disconnected. In order to reconnect to the wireless network, the operation will proceed to step 34 for iteration until a network connection is established.

(48):

The terminal STA0 has received the identities of the wireless networks, but found no identities identical to the identities stored in the network database 20. If the user decides to reconnect to the wireless networks, then the operation proceeds to step 50. If not, the operation proceeds to step 46.

(50):

The user decided to connect to a wireless networks having an identity not in the database DB. The terminal STA0 can refresh the configuration tables C1–C4 and network database 20 to add in the identity of this network. If the terminal STA0 receives a plurality of identities not identical to the predetermined identities, it establishes a new configuration table temporarily using a random priority list to sort the new identities, or simply appends the new identities into an existing configuration table. After this step is finished, the operation proceeds to step 40.

In practical operation, the configuration tables C1–C4 and network database 20 can be administrated by a front-end software application to allow users convenient establishing, editing, and refreshing of the configuration tables C1–C4 and the network database 20. A wireless network function driver is active in the terminal STA0 and can execute the operation as illustrated by the flowchart diagram in FIG. 4. Besides controlling the status pointer C by time, the present invention allows the user to choose status pointers using a simple query program. For example, when the user is connecting to a network with the terminal STA0, the query program asks the user which location the user is in, and then sets the status pointer C accordingly. The present invention gives the user more flexibility in both location and time in setting the priorities of wireless network connections.

In summary, the present invention utilizes a plurality of configuration tables, and each of the configuration tables utilizes different connection priorities to different wireless networks. The terminal can automatically choose a specified configuration table according to the contents of the status pointers, and then connect to the wireless network according to the priorities of the configuration table. Compared with the prior art's lack of flexibility, the present invention can dynamically adapt to different wireless network environments, thus enabling users more efficient and convenient access to network resources.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for controlling a network connection of the terminal in a wireless network system, the terminal capable of wirelessly transmitting and receiving data, the wireless network system comprising a plurality of wireless networks, the different wireless networks having different identities capable of being transmitted wirelessly by each wireless network, the terminal comprising:

a plurality of distinct sorting pointers, each distinct sorting pointer representing a unique priority;

a network database for recording a plurality of predetermined identities, wherein the network database has a plurality of key IDs stored in the database with each of key IDs corresponding to a predetermined identity;

a plurality of configuration tables, each configuration table for corresponding one predetermined identity to one unique sorting pointer, and each configuration table having at least a unique predetermined identity which corresponds to a sorting pointer; and a status pointer for representing an operational location and time;

the method comprising:

receiving identities of the plurality of wireless networks via wireless transmission;

choosing a configuration table from the plurality of configuration tables according to the status pointer;

comparing the predetermined identity of the chosen configuration table with the identities received, and if any of the plurality of identities received matches the predetermined identity, then choosing an identity according to the sorting pointer corresponding to the status pointer; and wirelessly connecting to the wireless network corresponding to the chosen identity, wherein a certification program is first processed, then the data being uploaded or downloaded between the terminal and the wireless network is encrypted according to the key ID which is corresponding to the wireless identity, and data being uploaded or downloaded between the terminal and the wireless network is encrypted according to the key ID corresponding to the network identity.

2. The method of claim 1 wherein when choosing an identity according to the matched sorting pointer corresponding to the predetermined identity, the predetermined identities matching the chosen identity have sorting pointers with higher priorities.

3. The method of claim 1 wherein each wireless network has at least an access point, and the identity of each wireless network is transmitted by the access point of each wireless network.

4. The method of claim 1 wherein the terminal is a notebook computer.

5. The method of claim 1 wherein each of the wireless networks is capable of continuously sending out a beacon signal comprising a corresponding identity of the wireless network, and the terminal is capable of receiving the plurality of identities corresponding to the wireless networks.

6. The method of claim 1 further comprising:

choosing an identity via a predetermined method when comparing the predetermined identities of the chosen configuration table to the identities received from the terminal results in no received identities being identical to any of the predetermined identities.

7. The method of claim 6 wherein the predetermined method chooses an identity randomly.

8. The method of claim 6 further comprising:

wirelessly connecting to the wireless network which is corresponding to the chosen identity; and updating the chosen configuration table according to the chosen identity.

9. The method of claim 8 further comprising:

updating all configuration tables according to the chosen identities.

10. The method of claim 1 wherein each configuration table corresponds to a unique list of prioritized user preferences for a specific operational time and physical location of the terminal.

11. A method for controlling a network connection of the terminal in a wireless network system, the terminal capable of wirelessly transmitting and receiving data, the wireless network system comprising a plurality of wireless networks, the different wireless networks having different identities capable of being transmitted wirelessly by each wireless network, and the plurality of wireless networks being capable of responding to a probe signal by wirelessly transmitting the identity corresponding to the wireless network, the terminal comprising:

a plurality of distinct sorting pointers, each distinct sorting pointer representing a unique priority;

a network database for recording a plurality of predetermined identities;

a plurality of configuration tables, each configuration table for corresponding one predetermined identity to one unique sorting pointer, and each configuration table having at least a unique predetermined identity which corresponds to a sorting pointer; and a status pointer for representing an operational location and time;

the method comprising:

sending out a probe signal through the terminal;

having the plurality of wireless networks respond to their own corresponding identities via wireless transmission to make the terminal capable of receiving the identities corresponding to the plurality of wireless networks;

choosing a configuration table from the plurality of configuration tables according to the status pointer;

comparing the predetermined identity of the chosen configuration table with the identities received, and if any of the plurality of identities received matches the predetermined identity, then choosing an identity according to the sorting pointer corresponding to the status pointer; and wirelessly connecting to the wireless network corresponding to the chosen identity.

12. The method of claim 11 wherein when choosing an identity according to the matched sorting pointer corresponding to the predetermined identity, the predetermined identities matching the chosen identity have sorting pointers with higher priorities.

13. The method of claim 11 wherein each wireless network has at least an access point, and the identity of each wireless network is transmitted by the access point of each wireless network.

14. The method of claim 11 wherein the terminal is a notebook computer.

15. The method of claim 11 wherein each of the wireless networks is capable of continuously sending out a beacon signal comprising a corresponding identity of the wireless network, and the terminal is capable of receiving the plurality of identities corresponding to the wireless networks.

16. The method of claim 11 further comprising:

choosing an identity via a predetermined method when comparing the predetermined identities of the chosen configuration table to the identities received from the terminal results in no received identities being identical to any of the predetermined identities.

17. The method of claim 16 wherein the predetermined method chooses an identity randomly.

18. The method of claim 16 further comprising:

wirelessly connecting to the wireless network which is corresponding to the chosen identity; and updating the chosen configuration table according to the chosen identity.

19. The method of claim 18 further comprising:

updating all configuration tables according to the chosen identities.

20. The method of claim 11 wherein each configuration table corresponds to a unique list of prioritized user preferences for a specific operational time and physical location of the terminal.

* * * * *